Patented Feb. 24, 1925.

1,527,903

UNITED STATES PATENT OFFICE.

GEORG MUTH, OF NUREMBERG, GERMANY, ASSIGNOR TO THE AMBER SIZE AND CHEMICAL COMPANY LIMITED, OF LONDON, ENGLAND.

MANUFACTURE OF ALUMINUM HYDROXIDE.

No Drawing. Application filed November 24, 1924. Serial No. 752,006.

*To all whom it may concern:*

Be it known that I, GEORG MUTH, a citizen of Germany, and residing at 20 Wetzendorferstrasse, Nuremberg, Germany, have invented certain new and useful Improvements in and Relating to the Manufacture of Aluminum Hydroxide, of which the following is a specification.

This invention relates to the manufacture of aluminum hydroxide.

It is known that natural double silicates or silico-aluminates such as potassium felspar (leucite), sodium felspar (albite, sodalithe, nephelin, &c.), may be decomposed by treating them with caustic or carbonates of alkalies by wet processes under very high pressure.

In the double silicates in question there is a considerable proportion of impurities and they contain such a large percentage of silica and have such a relatively small content of alumina, for instance potassium felspar contains 75 per cent. of silica ($SiO_2$) and only 18 per cent of alumina ($Al_2O_3$), that their treatment is not very remunerative from a commercial point of view. Not only is the cost of grinding such double silicates in order that they may be treated raised by reason of their content of impurities, but apparatus for treating a double silicate or silico-aluminate containing only 18 per cent of aluminum oxide must be as large again as that which is necessary for treating simple aluminum silicates such as, for example, china clay whose content of aluminum oxide is roughly stated more than twice that of an equal weight of a double silicate. There is the further disadvantage that for converting the natural double silicate (which is somewhat resistant to the reagents used) into alkali-metal silicates, an extremely high pressure, namely 18 to 20 atmospheres, must be employed and this also has the effect of rendering the process costly.

The object of the present invention is to provide an improved process for the manufacture of aluminum hydroxide from natural aluminum silicates, such as china clays.

The present invention comprises heating aluminum silicates with caustic alkalies or alkaline earths or alkali or alkaline-earth metal carbonates hereinafter referred to as "alkaline bodies" in the presence of water in a closed vessel at temperatures sufficient to give rise to a pressure of 3 to 4 atmospheres, or in the absence of water to like temperatures, namely to a temperature of 134 to 144° C.

The invention also comprises heating aluminum silicates, such as china clays, with alkalies or alkaline-earths or their carbonates in the presence of water to the boiling temperature to obtain easily decomposable alkali or alkaline-earth-metal aluminum silicates, and heating the resulting double silicates with a further proportion of alkali in a closed vessel in the presence of water to a temperature sufficient to give rise to a pressure of 3 to 4 atmospheres, or in the absence of water to like temperatures to effect its decomposition, namely to a temperature of 134 to 144° C.

The following particulars are given by way of example to illustrate suitable methods of carrying the invention into effect:—

Example I.

China clay and caustic soda are mixed together in proportions yielding a mixture containing 1.2 to 1.5 molecules $Na_2O$ to each molecule $Al_2O_3$; for example in the case of china clay containing 40 per cent of $Al_2O_3$ for each 100 parts of clay a proportion of caustic soda equivalent to 30 to 37 parts of $Na_2O$ is added, whereupon the mass is boiled for some time at atmospheric pressure and finally under a pressure of 3 to 4 atmospheres. The resulting alkali-metal silicate is separated from the aluminum hydroxide which may be treated by known processes to form aluminates, aluminum salts or metallic aluminum.

Example II.

Double silicates or silico-aluminates are produced by heating a mixture of china clay and caustic soda to a temperature of about 100° C. For instance, in the case of a clay containing 40 per cent of alumina a proportion of caustic soda equivalent to 15 to 18.5 parts of $Na_2O$ is added to each 100 parts of clay. After heating to 100° C. the product is mixed with a further proportion of caustic soda equivalent to 15 to 18.5 parts by weight of $Na_2O$ to each 100 parts of clay. The whole is then heated in the dry state to a temperature such as would give rise to a pressure of 3 to 4 atmospheres if a similar mixture containing water were heated in a closed vessel. On treating the product with water, sodium silicate may be extracted, leaving aluminum hydroxide as a residue. As will be understood, if desired, the whole of the alkali necessary to secure the decomposition of the china clay may be added at once and the dry mixture heated to a temperature such as would give rise to a pressure of 3 to 4 atmospheres if a similar mixture containing water were heated in a closed vessel.

It will be appreciated that in so far as the present invention is concerned with the employment of alkaline earth metal compounds in opening up aluminum silicates, it is clearly distinguished from processes involving the sintering of such silicates with lime and soda and leaching out the aluminate of soda thus produced for the purpose of recovering alumina from the aqueous extract.

Having now described my invention what I claim as new and desire to secure by Letters Patent is:—

Process for the manufacture of aluminum hydroxide and water-soluble silicates from natural aluminum silicates, which comprises heating aluminum silicates with alkaline bodies in the presence of water to the boiling temperature at normal atmospheric pressure to obtain an easily decomposable double silicate and heating the resultant double silicate with a further proportion of alkali to a temperature in the neighbourhood of 140° C.

In testimony whereof I have signed my name to this specification.

GEORG MUTH.

Witnesses:
 ADE DOTIE,
 ALEXIS V. PHILIPPOFL.